United States Patent
Jin

(10) Patent No.: US 10,333,150 B2
(45) Date of Patent: Jun. 25, 2019

(54) METHOD FOR MANUFACTURING OF SUBSTRATE FOR LEAD ACID BATTERY, POWDER MIXTURE FOR MANUFACTURING THE SAME AND SUBSTRATE FOR THE SAME

(71) Applicant: HYUNDAI MOTOR COMPANY, Seoul (KR)

(72) Inventor: Jae Eun Jin, Incheon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 379 days.

(21) Appl. No.: 15/092,981

(22) Filed: Apr. 7, 2016

(65) Prior Publication Data

US 2017/0155156 A1 Jun. 1, 2017

(30) Foreign Application Priority Data

Dec. 1, 2015 (KR) .................. 10-2015-0170231

(51) Int. Cl.
| | | |
|---|---|---|
| H01M 4/82 | (2006.01) | |
| H01M 4/66 | (2006.01) | |
| H01M 4/68 | (2006.01) | |
| H01M 10/06 | (2006.01) | |
| B22F 1/00 | (2006.01) | |
| B22F 3/00 | (2006.01) | |

(52) U.S. Cl.
CPC .......... *H01M 4/82* (2013.01); *B22F 1/00* (2013.01); *B22F 3/00* (2013.01); *H01M 4/663* (2013.01); *H01M 4/685* (2013.01); *H01M 10/06* (2013.01)

(58) Field of Classification Search
None
See application file for complete search history.

(56) References Cited

U.S. PATENT DOCUMENTS

| | | | | |
|---|---|---|---|---|
| 5,952,123 A | * | 9/1999 | Hatanaka | H01M 4/14 429/217 |
| 6,432,585 B1 | * | 8/2002 | Kawakami | C23C 18/31 429/209 |
| 2004/0142243 A1 | * | 7/2004 | Furukawa | C22C 11/06 429/245 |
| 2005/0158629 A1 | * | 7/2005 | Furukawa | C22C 11/06 429/245 |
| 2006/0046148 A1 | * | 3/2006 | Sakai | H01M 4/68 429/245 |
| 2008/0107960 A1 | * | 5/2008 | Furukawa | H01M 4/685 429/163 |
| 2013/0004841 A1 | * | 1/2013 | Thompkins | H01G 11/50 429/204 |
| 2013/0280595 A1 | * | 10/2013 | Kogure | H01M 2/1606 429/163 |

FOREIGN PATENT DOCUMENTS

| | | | | |
|---|---|---|---|---|
| JP | 2004-068112 A | | 3/2004 | |
| JP | 2005-032532 A | | 2/2005 | |
| JP | 2006-179449 A | | 7/2006 | |
| KR | 2013096042 | * | 8/2013 | ............ H01M 4/73 |

* cited by examiner

*Primary Examiner* — Jonathan Crepeau
*Assistant Examiner* — Angela J Martin
(74) *Attorney, Agent, or Firm* — Morgan Lewis & Bockius LLP

(57) ABSTRACT

A method for manufacturing a substrate for a lead acid battery includes manufacturing a powder mixture by mixing lead powder and carbon powder and manufacturing a substrate by compress-molding the powder mixture. 85 wt % to 95 wt % of the lead powder and 5 wt % to 15 wt % of the carbon powder are mixed, based on 100 wt % of the powder mixture.

5 Claims, No Drawings

METHOD FOR MANUFACTURING OF SUBSTRATE FOR LEAD ACID BATTERY, POWDER MIXTURE FOR MANUFACTURING THE SAME AND SUBSTRATE FOR THE SAME

CROSS-REFERENCE TO RELATED APPLICATION

This application claims the benefit of priority to Korean Patent Application No. 10-2015-0170231 filed in the Korean Intellectual Property Office on Dec. 1, 2015, the entire content of which is incorporated herein by reference.

TECHNICAL FIELD

The present disclosure relates to a method for manufacturing a substrate which functions as a current collector in a lead acid battery, a powder mixture for manufacturing the lead acid battery, and the substrate for the lead acid battery.

BACKGROUND

A lead acid battery is an inexpensive and highly reliable rechargeable battery, and thus, has been widely used for a vehicle, a power source of an electric vehicle such as a golf cart, or an industrial device such as an uninterruptible power supply (UPS) device and the like.

In general, a lead acid battery uses a sulfuric acid solution, which is strong acid, as an electrolyte, and thus, a substrate for the lead acid battery needs to be made of a material which is resistance to corrosion. Accordingly, lead and a lead alloy that resist sulfuric acid have been commonly used as the substrate material. The substrate for the lead acid battery is generally manufactured by casting, rolling expansion, rolling press, and the like. However, a relatively small amount of alloy is used in the lead alloy, and the lead alloy is not suitable as a material or light-weighted substrate since the lead alloy is used for enhancing the resistance to corrosion or improving strength instead of being used for reducing weight.

A constituent material that forms the lead acid battery, such as a substrate, an active material, and the like are made of lead having high density such that the lead acid battery is heavy compared to other rechargeable batteries. A number of methods have been developed to reduce battery weight, for example, a method for manufacturing a substrate by lead-plating a light-weighted metal (e.g., aluminum and the like) and a method for manufacturing foam-type porous substrate. The method of lead-plating the light-weighted metal may significantly reduce the weight of the substrate. However, this method cannot be used in welding of polarity group for the battery such that the substrate manufactured by lead-plating light-weighted metal is commercially available. In case of the foam-type substrate, the foam-type substrate cannot be used because another active material that is different from an existing active material needs to be developed and the shape of the battery changes, and thereby, an additional technique for design modification and development of is necessary.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a method for manufacturing a substrate by mixing lead and carbon for light weight while maintaining the existing shape of the substrate, a powder mixture for manufacturing the substrate, and a substrate for a lead acid battery.

A method for manufacturing a substrate for a lead acid battery according to an exemplary embodiment in the present disclosure includes manufacturing a powder mixture by mixing lead powder and carbon powder and manufacturing the substrate by compress-molding the powder mixture.

85 to 95 wt % of the lead powder and 5 to 15 wt % of the carbon powder may be mixed with respect to 100 wt % of the powder mixture.

The lead powder may be Pb—Sn—Ca alloy powder.

The lead powder may include one lead powder having a particle diameter of 10 to 50 μm and another lead powder having a particle diameter of 200 to 250 μm.

The lead powder may include 40 to 75 wt % of lead powder having a particle diameter of 10 to 50 μm and 25 to 60 wt % of lead powder having a particle diameter of 200 to 250 μm with respect to 100 wt % of the lead powder.

Carbon powder may include graphite, carbon black, or carbon nanotube.

The carbon powder may have an average particle diameter of 1 to 5 μm.

The powder mixture may be compress-molded at a temperature of 25 to 150° C. with a pressure of 50 to 200 ton.

A powder mixture for manufacturing a substrate for a lead acid battery according to another exemplary embodiment in the present disclosure includes 85 to 95 wt % of lead powder and 5 to 15 wt % of carbon powder.

The lead powder may be Pb—Sn—Ca alloy powder.

The lead powder may include one lead powder having a particle diameter of 10 to 50 μm and another lead powder having a particle diameter of 200 to 250 μm.

The lead powder may include 40 to 75 wt % of one lead powder having a particle diameter of 10 to 50 μm and 25 to 60 wt % of another lead powder having a particle diameter of 200 to 250 μm with respect to 100 wt % of lead powder.

The carbon powder may include graphite, carbon black, or carbon nanotube.

The carbon powder may have an average particle diameter of 1 to 5 μm.

A substrate for a lead acid battery according to another exemplary embodiment in the present disclosure includes 85 to 95 wt % of lead and 5 to 15 wt % of carbon.

Hardness of the substrate may be 13 to 18 Hv and elongation of the substrate may be 3 to 5.5%.

The substrate for the lead acid battery, manufactured by the method according to the exemplary embodiment in the present disclosure can lighten the width of the substrate by about 40% compared to an existing lead acid battery. This implies that about 1 kg less weight with reference to a 68 Ah battery.

The substrate for the lead acid battery manufactured by the method according to the exemplary embodiment in the present disclosure has lower electric resistance compared to an existing substrate such that 10% increase of charging/discharging performance and 5% increase of durability can be expected.

DETAILED DESCRIPTION OF THE EMBODIMENTS

Various advantages and features of the present disclosure and methods accomplishing thereof will become apparent from the following description of embodiments with reference to the accompanying drawings. However, the present disclosure is not be limited to the embodiments set forth herein but may be implemented in many different forms. The embodiments may be provided so that the present disclosure will be complete, and will fully convey the scope of the invention to those skilled in the art and therefore the present disclosure will be defined within the scope of claims. Throughout the specification, like reference numerals denote like elements.

Accordingly, technologies well known in some exemplary embodiments are not described in detail to avoid an obscure interpretation of the present disclosure. Unless defined otherwise, it is to be understood that all the terms (including technical and scientific terms) used in the specification has the same meaning as those that are understood by those who skilled in the art. In addition, unless explicitly described to the contrary, the word "comprise" and variations such as "comprises" or "comprising" will be understood to imply the inclusion of stated elements but not the exclusion of any other elements. Further, unless explicitly described to the contrary, a singular form includes a plural form in the present specification.

A method for manufacturing a substrate for a lead-acid battery according to an exemplary embodiment in the present disclosure includes manufacturing a powder mixture by mixing lead powder and carbon powder and manufacturing the substrate by compress-molding the powder mixture.

In the present disclosure, a lead-carbon composite material is used for reducing the weight of the substrate. Since solid solubility of carbon with lead is almost close to zero, an alloy of carbon and lead cannot be easily produced. Thus, powder sintering, which is irrelevant to solid solubility, is used to mix lead and carbon.

First, a powder mixture is produced by mixing lead powder and carbon powder.

In this case, the powder mixture may include lead powder 85 wt % to 95 wt % and carbon powder 5 wt % to 15 wt %, based on 100 wt % of the powder mixture.

When the amount of carbon powder in the powder mixture is too small, that is, less than 5 wt %, the weight of the substrate does not decrease and electrical resistance and corrosion density enhancement effects become insignificant. When an excessive amount of carbon powder is mixed, that is more than 15 wt %, mechanical characteristics such as hardness and elongation may be degraded. Thus, the lead powder and the carbon powder are mixed with the above-stated range.

As the lead powder, pure lead metal powder may be used. However, it is not limited thereto that lead alloy powder may be used, for example, Pb—Sn—Ca alloy powder may be used. In a certain embodiment, Pb—Sn—Ca alloy powder may comprise Sn 0.1 to 2.0 wt %, Ca 0.01 to 0.1 wt %, and the balance of Pb. The Pb—Sn—Ca alloy powder has excellent acid-resistance and suppresses generation of hydrogen gas generation during battery charging/discharging to thereby reduce an electrolyte decrease in the battery.

Since hardness of the lead powder is very low, porosity is changed according to the size of the lead powder during compression molding. When the lead powder is compress-molded, density decreases to be less than that before the molding.

In the present disclosure, lead powder having two different sizes may be mixed. For light weight, it is advantageous to use the lead powder having one size to increase porosity to thereby reduce density. However, in this case, hardness and elongation are significantly reduced, thereby decreasing durability of the lead acid battery. Specifically, lead powder having a particle diameter of 10 to 50 μm and lead powder having a particle diameter of 200 to 250 μm may be mixed.

As described above, when two types of lead powder are used, a gap fraction in mixing of the two types of powder can be minimized, thereby acquiring excellent mechanical features. For example, 40 to 75 wt % of lead powder having a particle diameter of 10 to 50 μm and 25 to 60 wt % of lead powder having a particle diameter of 200 to 250 μm may be mixed to form 100 wt % of lead powder. Within such an above-stated range, light weight and improved mechanical characteristic can be achieved.

Carbon powder is mixed to improve an electrochemical characteristic in addition to reducing the weight of the lead acid battery. Any powder in which a carbon component is included is applicable. Specifically, the carbon component may include graphite, carbon black, or carbon nanotube (CNT). High-purity carbon having excellent electric conductivity, such as carbon black or carbon nanotube may be used. However, even when a graphite material is used, there is no problem in lightening weight and improving the electrochemical characteristic. Here, the carbon powder may have an average particle diameter of 1 to 5 μm to evenly mix with the lead powder.

Next, the powder mixture is compress-molded to manufacture a substrate. The substrate manufactured through such a method may be directly applied to an existing battery manufacturing process. The battery manufacturing process using the substrate may use a general method, and therefore, no further detailed description will be provided.

When the powder mixture is compress-molded, the compression-molding may be performed at a temperature of about 25° C. to about 150° C. with a pressure of about 50 to 200 ton. Within the above-stated range, a substrate having an excellent mechanical characteristic can be manufactured.

The powder mixture for manufacturing the substrate for a lead acid battery according to the present disclosure includes 85 wt % to 95 wt % of lead powder and 5 wt % to 15 wt % of carbon powder, based on based on the total powder mixture.

When the amount of carbon powder is too small, that is, less than 5 wt %, the weight of the lead acid battery may not decrease, and further, electric resistance and corrode density may not increase. When the amount of carbon powder is too large, mechanical characteristics such as hardness and elongation may be negatively influenced. Accordingly, the lead powder and the carbon powder are mixed with the above-stated range.

The lead powder may include pure lead metal powder, but may also include lead alloy powder. In a certain embodiment, the lead powder may include Pb—Sn—Ca alloy powder. For example, the Pb—Sn—Ca alloy powder may comprise 0.1 to 2.0 wt % of Sn, 0.01 to 0.1 wt % of Ca, and the balance of Pb. The Pb—Sn—Ca alloy powder has excellent acid resistance, and suppresses generation of hydrogen gas during battery charging/discharging to thereby minimize an electrolyte decrease of the battery.

Since hardness of the lead powder is very low, porosity is changed according to the size of lead powder during compression molding. When the lead powder is compress-molded, density is decreased compared to that before the molding.

In the present disclosure, lead powder having two different sizes may be mixed to be used. For weight lightening, lead powder having one size may be used to increase porosity to thereby reduce density. However, in this case, hardness and elongation are significantly reduced, thereby decreasing durability of the lead acid battery. In a certain embodiment, lead powder having a particle diameter of 10 to 50 μm and lead powder having a particle diameter of 200 to 250 μm may be mixed. When lead powder having two different sizes is used, a gap fraction can be minimized, thereby acquiring a lead acid battery having an excellent mechanical feature. For example, 40 to 75 wt % of lead powder having a particle diameter of 10 to 50 μm and 25 to 60 wt % of lead powder having a particle diameter of 200 to 250 μm may be mixed to form 100 wt % of lead powder. Within such an above-stated range, weight of the lead acid battery can be reduced and mechanical characteristic can be improved.

Carbon powder is mixed to improve an electrochemical characteristic in addition to weight lightening of the lead acid battery. Any powder in which a carbon component is included is applicable. For example, the carbon component may include graphite, carbon black, or carbon nanotube (CNT), and high-purity carbon having excellent electric conductivity, such as carbon black or carbon nanotube may be used. In this way, even when a graphite material is used, weight can be reduced and the electrochemical characteristic can be improved. The carbon powder may have an average particle diameter of 1 to 5 μm. With such an above-stated range, the carbon powder can be evenly mixed with the lead powder.

A substrate for the lead acid battery according to an exemplary embodiment in the present disclosure includes 85 to 95 wt % of lead and 5 to 15 wt % of carbon. Hardness may be 13 to 18 Hv, and elongation may be 3 to 5.5%.

Hereinafter, an example and a comparative example of the present disclosure will be described. However, the following example is only the examples, but the present disclosure is not limited to the following Example.

Preparation Example—Manufacturing of Lead Powder

A Pb-1.2Sn-0.07Ca alloy ingot was melt to manufacture lead powder using an atomizing method. Depending on the type of particle size of lead powder, lead powder of a particle diameter of 10 to 50 μm (Preparation example 1), lead powder of a particle diameter of 50 to 100 μm (Preparation example 2), lead powder of a particle diameter of 100 to 150 μm (Preparation example 3), lead powder of a particle diameter of 150 to 200 μm (Preparation example 4), and lead powder of a particle diameter of 200 to 250 μm (Preparation example 5) were respectively manufactured. Further, a mixture (Preparation example 6) of weight ratio of 50:70 of Preparation Example 1 and Preparation Example 5, and a mixture (Preparation example 7) of weight ratio of 50:50 of Preparation example 1 and Preparation example 5, and a mixture (Preparation example 8) of weight ratio of 30:70 of Preparation example 1 and Preparation Example 5 were respectively prepared.

Each of the manufactured lead powders was press-molded into the shape of a 140×140 mm² sized substrate using a 200-ton press. Hardness and elongation of each of the press-molded substrates was measured and summarized in Table 1. A micro vickers hardness tester was used to measure vickers hardness, and elongation was measured through a tensile test.

TABLE 1

| Section | Preparation Example 1 | Preparation Example 2 | Preparation Example 3 | Preparation Example 4 | Preparation Example 5 | Preparation Example 6 | Preparation Example 7 | Preparation Example 8 |
|---|---|---|---|---|---|---|---|---|
| Density (g/cm³) | 10.4 | 10.3 | 10.1 | 10 | 9.9 | 10.5 | 10.6 | 10.3 |
| Hardness (Hv) | 9.2 | 9.1 | 8.6 | 8.8 | 9.1 | 10.8 | 12.5 | 10.3 |
| Elongation (%) | 5.3 | 5.1 | 4.7 | 5.0 | 5.2 | 5.5 | 5.8 | 5.3 |

As shown in Table 1, compared to other preparation examples, density was slightly high but hardness and elongation were significantly high in Preparation Examples 6 and 7.

Example 1

4 wt % of graphite powder having an average particle diameter of 2.5 μm was evenly mixed to 96 wt % of lead powder of Preparation Example 7 using a ball mill. The mixture was press-molded into the shape of a 140×140 mm² sized substrate using a 200-ton press. Hardness and elongation of the substrate were measured using the above-stated method, and electrical resistance and corrosion current density were measured using the following method and Table 2 shows results of the measurement.

Further, hardness and elongation are generally inversely proportional to each other, and accordingly, they cannot be simultaneously increased. Thus, the two features should be properly combined for durability, and in the present disclosure, a value of hardness and a value of elongation were multiplied for comparative evaluation. Electrical resistance was measured using a 4-point method, and corrosion current density was measured using a potentiodynamic anodic polarization test.

Example 2

A substrate was manufactured as in the Exemplary Embodiment 1, except that 8 wt % of graphite powder was mixed to 92 wt % of lead powder having an average particle diameter of 2.5 μm of Preparation Example 7.

Example 3

A substrate was manufactured as in the Exemplary Embodiment 1, except that 13 wt % of graphite powder was mixed to 87 wt % of lead powder having an average particle diameter of 2.5 μm of Preparation Example 7.

Example 4

A substrate was manufactured as in the Exemplary Embodiment 1, except that 16 wt % of graphite powder was mixed to 84 wt % of lead powder having an average particle diameter of 2.5 μm of Preparation Example 7.

Comparative Example 1

A substrate was manufactured as in the Exemplary Embodiment 1, except that only the lead powder of Preparation Example 7 was used and the carbon powder was not mixed.

TABLE 2

|  | Example 1 | Example 2 | Example 3 | Example 4 | Comparative Example 1 |
|---|---|---|---|---|---|
| Density (g/cm³) | 9.1 | 8.1 | 7 | 6.5 | 10.6 |
| Hardness (Hv) | 13.8 | 16.2 | 17.2 | 17.4 | 12.5 |
| Elongation (%) | 5.5 | 5.3 | 5.0 | 3.8 | 5.8 |
| Hardness × Elongation | 75.9 | 85.9 | 86 | 66.1 | 72.5 |
| Electrical resistance (μΩ · cm) | 18 | 15 | 13 | 12 | 21 |
| Corrosion current density (μA/cm²) | 11 | 6 | 5 | 6 | 13 |

As shown in Table 2, compared to Comparative Example 1 where no carbon powder was mixed, density, electric resistance, and corrosion current density were increased in Example 1 to Example 4. Further, hardness and elongation were excellent in Examples 2 and 3 in addition to the electrical resistance and corrosion current density.

The present disclosure is not limited to the above Examples but may be manufactured in different various forms and it may be understood that a person having ordinary skilled in the art to which the present disclosure pertains may perform the present disclosure in other forms without changing the technical ideas or the essential features of the present disclosure. Therefore, it should be understood that the above-mentioned embodiments are not restrictive but are exemplary in all aspects.

What is claimed is:

1. A powder mixture for manufacturing a substrate for a lead acid battery, comprising 85 wt % to 95 wt % of lead powder and 5 wt % to 15 wt % of carbon powder,
    wherein the lead powder comprises lead powder having a particle diameter of 10 μm to 50 μm and lead powder having a particle diameter of 200 μm to 250 μm, and
    wherein the lead powder comprises 40 wt % to 75 wt % of lead powder having a particle diameter of 10 μm to 50 μm and 25 wt % to 60 wt % of lead powder having a particle diameter of 200 μm to 250 μm, based on 100 wt % of the lead powder.

2. The powder mixture of claim 1, wherein the lead powder is Pb—Sn—Ca alloy powder.

3. The powder mixture of claim 1, wherein the carbon powder comprises graphite, carbon black, or carbon nanotube.

4. The powder mixture of claim 1, wherein the carbon powder has an average particle diameter of 1 μm to 5 μm.

5. A substrate for a lead acid battery, the substrate comprising 85 wt % to 95 wt % of lead and 5 wt % to 15 wt % of carbon,
    wherein hardness of the substrate is 13 Hv to 18 Hv and elongation of the substrate is 3% to 5.5%.

* * * * *